United States Patent [19]

Battistella

[11] Patent Number: 5,131,241
[45] Date of Patent: Jul. 21, 1992

[54] METHOD FOR FREEZING FOOD PRODUCTS IN CONTAINERS, AND AN AUTOMATIC PLATE FREEZER FOR IMPLEMENTING THE METHOD

[75] Inventor: Guido Battistella, Brugherio, MI, Italy

[73] Assignee: Stal Samifi S.p.A., Caponago, MI, Italy

[21] Appl. No.: 681,760

[22] Filed: Apr. 8, 1991

[30] Foreign Application Priority Data

Apr. 19, 1990 [IT] Italy .................. 20075 A/90

[51] Int. Cl.⁵ ............................................. F25C 5/14
[52] U.S. Cl. ................... 62/341; 198/347.1; 198/721
[58] Field of Search ............. 198/347.1, 721; 62/57, 62/341

[56] References Cited

U.S. PATENT DOCUMENTS

| | | | |
|---|---|---|---|
| 2,882,697 | 7/1956 | Amerio et al. | 62/158 |
| 3,020,731 | 2/1962 | Knowles | 62/341 |
| 3,052,339 | 9/1962 | Carter | 198/721 X |
| 3,271,973 | 9/1966 | Amerio et al. | 62/341 |
| 3,557,975 | 1/1971 | Amerio | 214/16.4 |
| 4,240,270 | 12/1980 | McLaughlin | 62/341 |
| 4,423,604 | 1/1984 | Riley | 62/341 |
| 4,432,214 | 2/1984 | Richelli et al. | 62/341 |
| 4,553,406 | 11/1985 | Richelli et al. | 62/341 |
| 4,841,881 | 6/1989 | Battistella | 108/91 |
| 4,907,421 | 3/1990 | Battistella | 62/341 |
| 5,040,383 | 8/1991 | Gram | 62/341 |

FOREIGN PATENT DOCUMENTS

| | | |
|---|---|---|
| 2262913 | 3/1974 | France . |
| 2359579 | 7/1976 | France . |
| 2531522 | 2/1984 | France . |
| 1259073 | 1/1972 | United Kingdom . |
| 2041313 | 9/1980 | United Kingdom . |
| 2120776 | 12/1983 | United Kingdom . |
| 2195429 | 4/1988 | United Kingdom . |

Primary Examiner—William E. Tapolcai
Attorney, Agent, or Firm—Oblon, Spivak, McClelland, Maier & Neustadt

[57] ABSTRACT

A method and an automatic plate freezer for freezing food products in boxes or trays, or in containers of low mechanical strength and therefore being deformable, or of nonparallelepiped shape.

Such boxes or containers are frozen in a plate freezer within which a moisture-free atmosphere is maintained together with dehumidified cold air circulation. Jets of dehumidified cold air are fed under the base of the containers in the container loading/discharge station to form an air cushion between the upper surface of the plate at rest in the station and the base of the containers, which can thus be easily thrust forward directly by other successively loaded containers insofar as the resistance to the movement of the containers along the plate is very low.

1 Claim, 6 Drawing Sheets

METHOD FOR FREEZING FOOD PRODUCTS IN CONTAINERS, AND AN AUTOMATIC PLATE FREEZER FOR IMPLEMENTING THE METHOD

Background of the Invention

1. Field of the Invention

This invention relates to a method for freezing food products packaged in boxes, trays, dishes, bags and the like, and to an automatic plate freezer for implementing the method.

2. Discussion of the Background

Food products for freezing can be considered to form part of two large groups. The first group comprises those products which are frozen in parallelepiped containers having such a consistency or strength as to withstand the mechanical stresses to which they are subjected during their insertion and movement within the freezer. The second group comprises those products which are frozen after being packaged in bags or in trays of low mechanical strength or of non-parallelepiped shape such as trays with their side walls diverging outwards from their base.

The products of the first group are frozen in automatic plate freezers, i.e. of the type comprising a plurality of superposed spaced-apart plates through which a refrigerant fluid circulates. The products to be frozen, enclosed in their respective strong parallelepiped containers and arriving from a conveyor belt, are loaded onto a plate positioned in a loading station and spaced apart from the immediately overlying plate. A number of such containers are loaded simultaneously side by side to form a row substantially equal to the plate width. When the next row of containers is loaded, the containers of this second row rest against the containers of the first row and push them forward. This is repeated until the plate is completely loaded, during which a large number of rows move along the plate, each row being pushed forward by the next row and itself pushing the previous row forward.

Such a procedure can be followed only if the products to be frozen are enclosed in strong parallelepiped containers.

If the products to be frozen are enclosed in containers in the form of bags, boxes without strength or trays with their side walls inclined to the base, a procedure involving container movement by mutual pushing cannot be used because the containers could undergo compression or deformation, with the danger of damaging not only the container but also the wrapping of the food products, which could escape from the container before being frozen. In this respect, it must be taken into consideration that the containers pushed along the plates must withstand considerable stresses depending on the plate length, the number of containers present in the length direction of the plate to be moved along it, the presence of frost or ice on the plate, possible adherence of the food product to the plate, and the weight of the container, and thus the overall resistance to be overcome in order to move the containers.

To obviate the aforesaid drawbacks, such containers are currently frozen on a different type of freezer, i.e., they are loaded onto an endless conveyor belt driven within a large refrigerated compartment in which fans blow very cold air over the containers until the products contained in them are frozen. These types of freezers have very low efficiency and the time required for freezing the food products is excessively long, with the result that the freezer volume must be excessively large.

The efficiency of plate freezers is much higher than that of the aforesaid cold air freezers, and because of this plate freezers are in fact also used for products enclosed in boxes of low mechanical strength or in bags, dishes, trays or the like of non-parallelepiped shape. For this purpose, at the loading station for the plate freezer, each row of containers (originating from a conveyor belt) is pushed forward onto the plate by an automatic pusher substantially consisting of a long transverse bar which rests against the upstream side of all the containers of the considered row and pushes them forward onto the freezer plate. The next container row is pushed onto the plate by another pusher identical to the first and which simultaneously pushes the first pusher forward along the plate together with the first container row.

Thus a plurality of container rows builds up on the plate, each row being moved forward along the plate by a respective pusher (possibly shaped to accommodate the container shape), so that a plurality of pushers is also present on the plate.

As the freezer comprises a plurality of freezer plates, it is apparent that this method requires a very large number of pushers, itself representing a considerable problem in that when the pushers emerge from the discharge station at which they push the frozen products out, the pushers have to be recovered and returned to the loading station.

Plate freezers are well known and various types are described in the patents: U.S. Pat. Nos. 2,882,697, 3,271,973, 4,240,270, 4,423,604, 4,432,214, GB-A-2,041,313, GB-A-2,120.776 and FR-A-2,531,522.

Spacer devices for the plates of plate freezers at a controlled distance apart are described in the patents: U.S. Pat. Nos. 4,240,270, 4,423,604, 4,841,881 and GB-A-2,195,429.

Automatic pushers for pushing container rows forward on the loading plate of a plate freezer are described in the patents: U.S. Pat. Nos. 3,271,973, 3,557,975, 4,432,214, GB-B-1,259,073, GB-A-2,041,313 and FR-A-2,531,522.

It has also been proposed to insert low-strength or non-parallelepiped containers into suitable seats provided in strong parallelepiped frames which are rested on and made to move along the plate surface in the same manner as normal strong parallelepiped containers. However, such frames have obvious drawbacks such as the fact that their presence necessarily reduces the number of containers which can be housed on each plate, the fact that the frames have to be returned to the loading station after being pushed out of the freezer discharge station, and the fact that the seats provided in them are unable to receive and move containers having a shape different from that of the seats or such that two or more containers cannot be housed in the same seat.

Thus, plate freezers have the highest efficiency but have considerable drawbacks when used for freezing food products enclosed in boxes of low mechanical strength, in bags, or in dishes or trays of non-parallelepiped shape, and in particular with side walls which diverge upwards from the tray base. As stated, these drawbacks are due to the fact that a large number of pushers together with complicated automatic systems for returning the pushers leaving the discharge station to the loading station are required, or supplementary frames with seats for housing the containers are necessary.

SUMMARY OF THE INVENTION

The main object of the present invention is to provide an automatic plate freezer for deep-freezing food products packaged in boxes, bags or trays of any shape but with a flat base, the freezer being of reliable and simple operation, of relatively simple and compact structure, and allowing effective freezing of food products without damage to the containers in which they are enclosed.

This and further objects are attained by a method by which the containers for food products to be deep-frozen are loaded into and frozen in a plate freezer within which a substantially moisture-free atmosphere is maintained together with dehumidified cold air circulation. Preferably, jets of dehumidified cold air are fed under the base of the containers located on the plate positioned in the container loading station to lift the containers from the plate surface.

In this manner, as freezing is effected in a substantially dry atmosphere there is no formation of frost which could hinder the movement of the containers along the freezer plates and reduce heat transfer, the dehumidified cold air circulation within the freezer increasing heat transfer from the product to be frozen as it acts over all surfaces not in contact with the plates, whereas the dehumidified air jets fed under the base of the containers in the loading/discharge station create practically an air cushion between the container base and the adjacent surface of the underlying plate, so that the containers can be easily pushed forward and thus move along the plate, practically without friction. The result is that the row of containers being loaded into the freezer can be allowed to come into contact with and act directly on the containers of the row previously inserted into the freezer, which then undergo easy movement along the plate without suffering damage.

The automatic plate freezer for implementing the aforesaid method is characterized by comprising means for cooling and dehumidifying the air present within the freezer and for maintaining it at low temperature and dehumidified, and means for generating and maintaining a cold dehumidified air stream between the plates within the freezer.

The plates of the automatic freezer preferably comprise a plurality of channels in which holes are provided opening into the upper surface of each plate, means being provided for feeding cold dehumidified air into said channels of that plate positioned at the loading station for the products to be frozen in the freezer.

The method and the structure and characteristics of the freezer according to the present invention will be more apparent from the description given hereinafter by way of nonlimiting example with reference to the accompanying drawings in which:

DESCRIPTION OF THE PREFERRED EMBODIMENTS

FIGS. 1 to 4 show an automatic freezer comprising an insulated housing 1, described hereinafter, containing a plurality of refrigeration plates 19, also described hereinafter and shown in detail in FIGS. 5, 6 and 7 and devices for moving them and positioning them one at a time at the correct level in a loading station to be loaded with or unloading packages or containers enclosing the food products to be frozen, these devices not being described nor shown on the drawings as they comprise the normal frames, hydraulic cylinders and other parts used in this type of freezer and illustrated in the previous patents cited in the introduction to the present description.

The freezer also comprises a loading device 2 for the packages or containers 22, which is also of well known type and commonly used in such freezers, for example of the types described in the patents U.S. Pat. No. 3,557,975 and GB-B-1,259,073, with the difference being that in the case of the present invention, it is totally ducted and isolated from the outside environment. A conveyor belt 6 for the packages arriving at the housing 1 and a conveyor belt 7 for the packages leaving at the housing 1 are provided at the front and rear of the freezer respectively, these belts having that portion close to the the housing enclosed within ducts 3 and 4 which are connected together by a channel 5 to isolate the areas in which the packages are introduced into the housing 1 and discharged from it, so that the only apertures through which air can enter and leave are apertures 3a and 4a, which have cross-sections slightly greater than that of the packages 22, these apertures being provided with closure devices of known structure, which are normally closed and open only when the packages have to pass through them. In the embodiment shown on the drawings, a self-contained unit 8 is shown schematically for refrigerating and dehumidifying the air contained in the housing 1 and in the ducts 3 and 4 connected to it, the refrigeration unit 8 being connected to the housing 1 by connectors and ducting 9 and 10 and being connected to ducts 3 and 4 by means of the connection branch 11.

The purpose of the unit 8 is to cool to a temperature similar to that of the refrigeration plates 19 and to continuously dehumidify both the air present within the freezer and the air which enters through the ducts 3 and 4 together with the product to be frozen. or from other sources.

The refrigeration and dehumidification unit 8 is put into operation before operating the freezer, i.e., before feeding the refrigerant fluid into the plates, in order to prevent frost forming on them, the unit also circulating the cold dehumidified air within the freezer so that it aids heat transfer with the product to be frozen.

A device 12 is provided to cool and dehumidify air withdrawn from the interior of the housing 1 (instead, but less advantageously, the air fed by the device 12 could be taken from the compressed air main of the factory in which the freezer operates), compress it, remove any traces of impurities and feed it to a device described hereinafter and shown in FIG. 8, which then feeds it to the plate 19 which is at rest in the position for loading, and only to that plate. This air traverses channels provided in each plate but separate from those through which the refrigerant fluid circulates, to feed the holes provided in the upper surface of each plate, through which the air is expelled in the form of jets which create air cushions able to lift the packages of products to be frozen and allow them to be moved by the loading device 2 under zero or nearly zero friction conditions.

A fundamental characteristic of the described freezer is that it operates under zero humidity conditions within the housing 1, and thus with the plates cold but dry, without frost, and with heat transfer of a mixed type, i.e., by direct contact between the packages and plates and by conduction to the cold air circulating within the housing 1.

The freezer is suitable for freezing food products enclosed in parallelepiped packages (freezing being improved by the absence of frost on the plates, i.e. by improved contact between the plates and packages) and products enclosed in trays either of non-parallelepiped shape or of low mechanical strength (it allowing the latter to be loaded, as loading is facilitated by the absence of friction and of adhesion with the plate, which if present result in forces which usually cause deformation of the packages when they are pushed in order to move along the plates).

Figure 1:
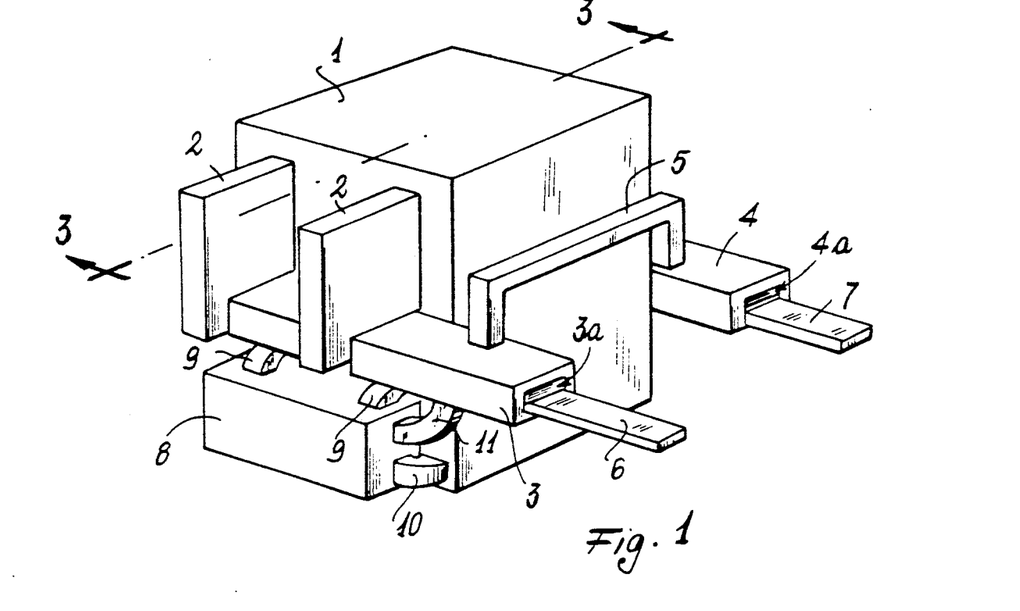
FIGS. 1 and 2 are two perspective schematic external views of the front and rear part of the freezer respectively.
Figure 2:
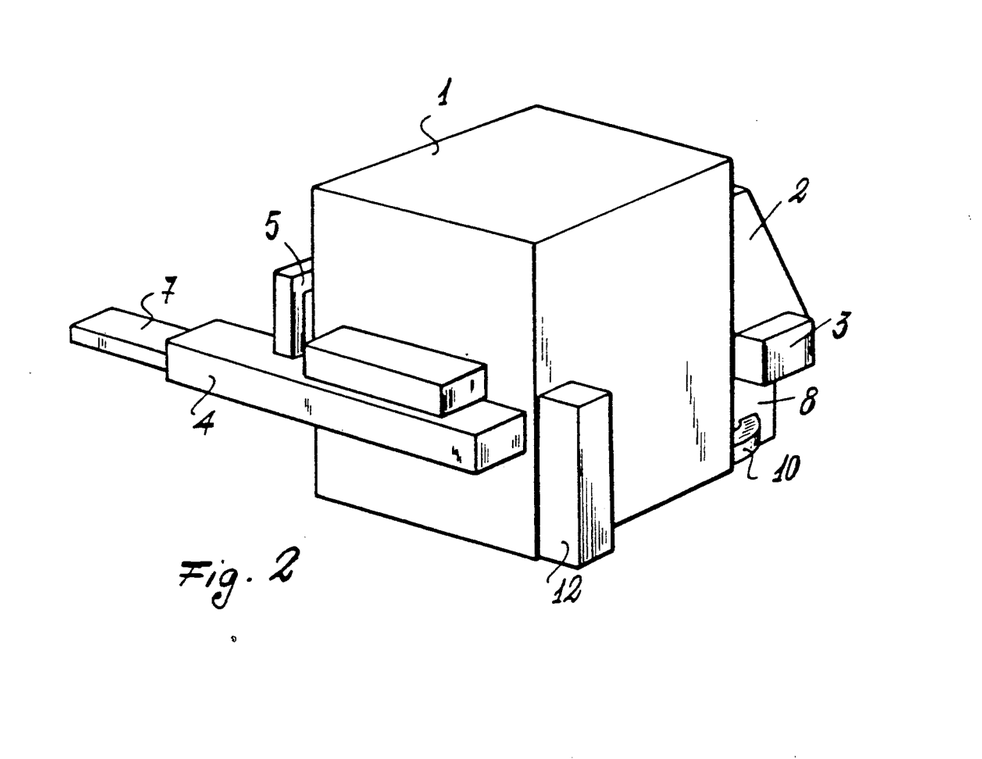
Figure 3:
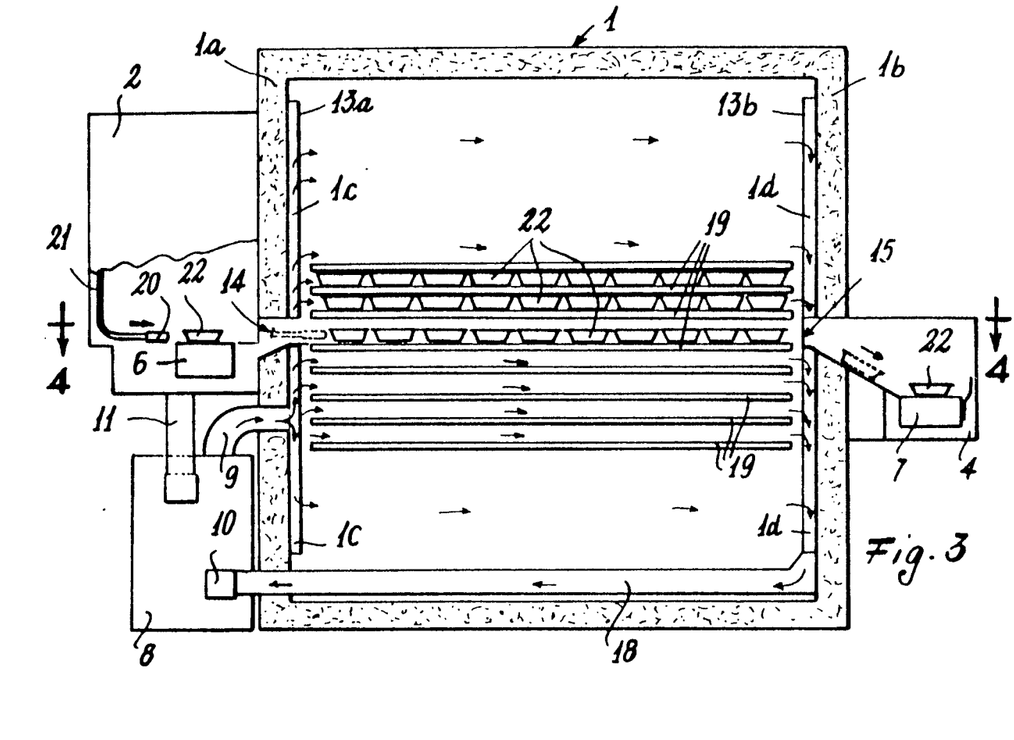
FIG. 3 is a schematic partial sectional view through the freezer taken along line III—III of FIG. 1.
Figure 4:
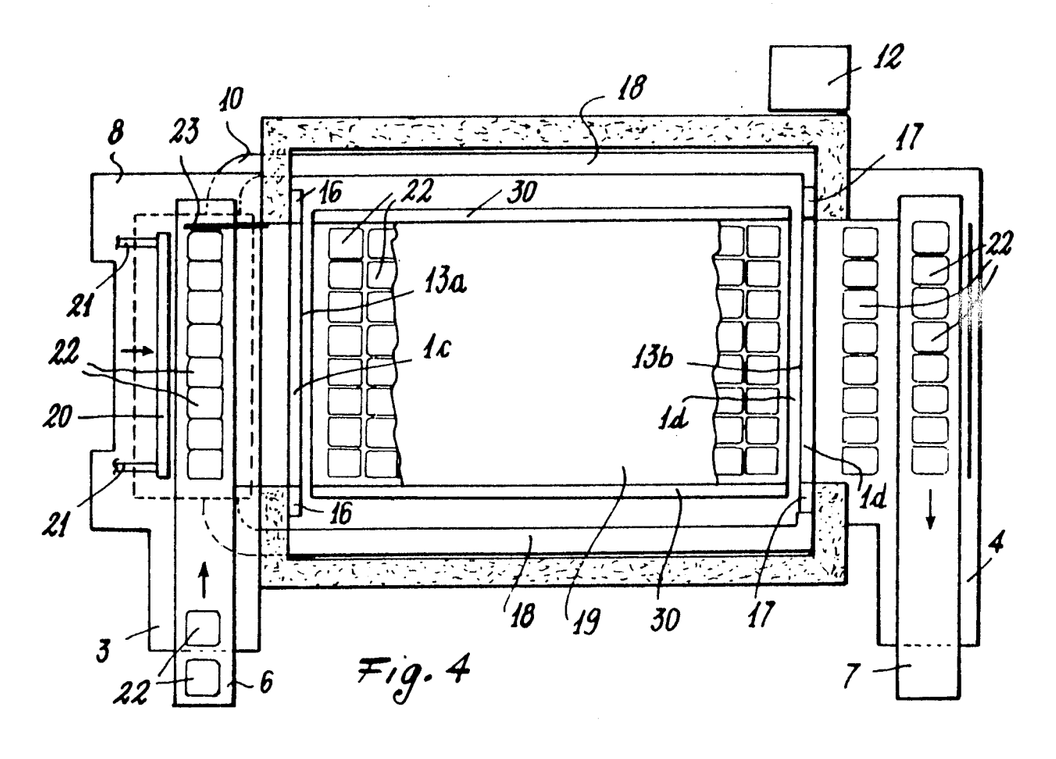
FIG. 4 is a schematic partial sectional view through the freezer taken along line IV'—IV of FIG. 3.

The housing 1 of the freezer according to the present invention is shown in vertical section in FIG. 3 and in horizontal section in FIG. 4.

The front end wall 1a and the rear end wall 1b, the term "front" meaning the end in which the product enters and the term "rear" meaning the end from which the product leaves, are both provided with inner backing walls 13a and 13b respectively, which form a front interspace 1c and a rear interspace 1d. These two interspaces are divided into two parts by the product entry mouth 14 and product exit mouth 15, namely an upper part and a lower part, which are connected together by lateral ducts 16 and 17 respectively.

On that face facing the interior of the housing 1, the backing walls 13a, 13b are provided with holes suitably distributed over their entire surface, through which a number of small air jets pass, these being indicated by small curved arrows in FIG. 3. The interspace 1c is connected to the air refrigeration and dehumidification unit 8 by the ducts 9, the interspace 1d being connected to the same unit by the ducts 18 and 10.

In the normal manner for this type of known freezer, the housing 1 houses a certain number of plates 19 in a superposed arrangement spaced apart by spacers of adequate height for the product to be frozen, with refrigerant fluid circulating through each plate, and means for raising the plates, lowering them, moving them to the level of the mouths 14 and 15, spacing them apart for the introduction of the product to be frozen, and making them approach each other again after the product has been loaded, which means will, as stated, not be described as they are of a usual type and are amply described in detail in the previous patents cited in the introduction to the present description.

The loading device 2 (which as stated is totally housed and isolated from the outside) is located outside the housing 1, and is of the type usually used in such freezers (see for example the patents U.S. Pat. Nos. 3,557,975, 4,432,214, GB-B-1,259,073 etc.) but of which the drawings show only the loading bar 20 and a small portion of the chains 21 which move the bar 20 forwards and backwards.

The purpose of the loading device is to transfer a row of packages 22, carried by the belt 6 and abutting against the stop element 23 (FIG. 4) onto the plate 19 at a rest position in front of the loading mouth 14. The unit 8 is able to circulate the air which it has previously dehumidified and cooled to a temperature similar to that of the plates 19, by feeding it through the channels 9 into the lower part of the interspace 1c and from here into the upper part of the interspace 1c via the lateral channels 16, and to draw said air from the lower and upper parts of the interspace 14, connected together by the lateral channels 17, via return channels 18 and 10 which again feed it to said unit 8.

The air is obliged to pass through the housing 1 and, in the region in which the plates 19 are located, to infiltrate between them and into the spaces left free by the packages 22, such air being at a temperature similar to the plates participates in the cooling of the product, to provide the same effect as that due to direct contact between the packages and the plates. It can be noted that this refrigerant effect due to the air is particularly important when the products have only one flat surface, such as when they are enclosed in plastic bags, because in this case the contact area between the packages and the plate above that onto which they are loaded is generally small, whereas the heat transfer due to the air is generally increased because the product is exposed to the air not only perimetrally but also on its top.

The dehumidified air circulation is metered by the unit 8, and is controlled so as to occur essentially between those plates 19 not in front of the moths 14 and 15, at a rate which does not cause the packages to move along the respective support plates towards the wall 13b, which is extremely close to the rear edge of the plates 19 so as not to allow the packages to fall from the plates.

Figure 5:
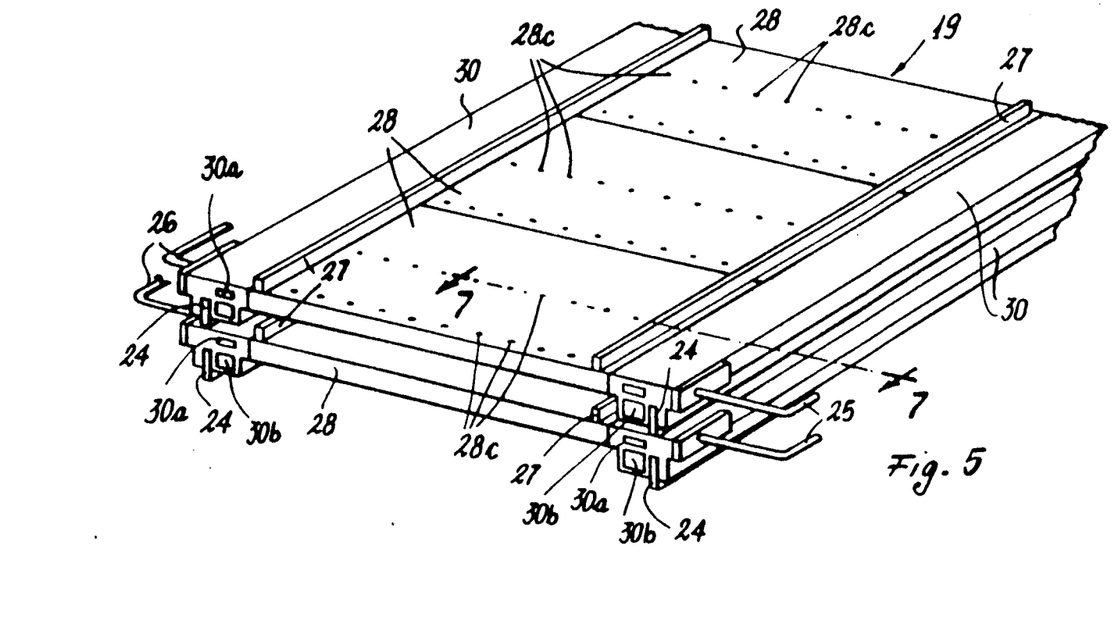
FIG. 5 is a perspective view of two plates forming part of the freezer and shown superposed and isolated from the remaining freezer structure.
Figure 6:
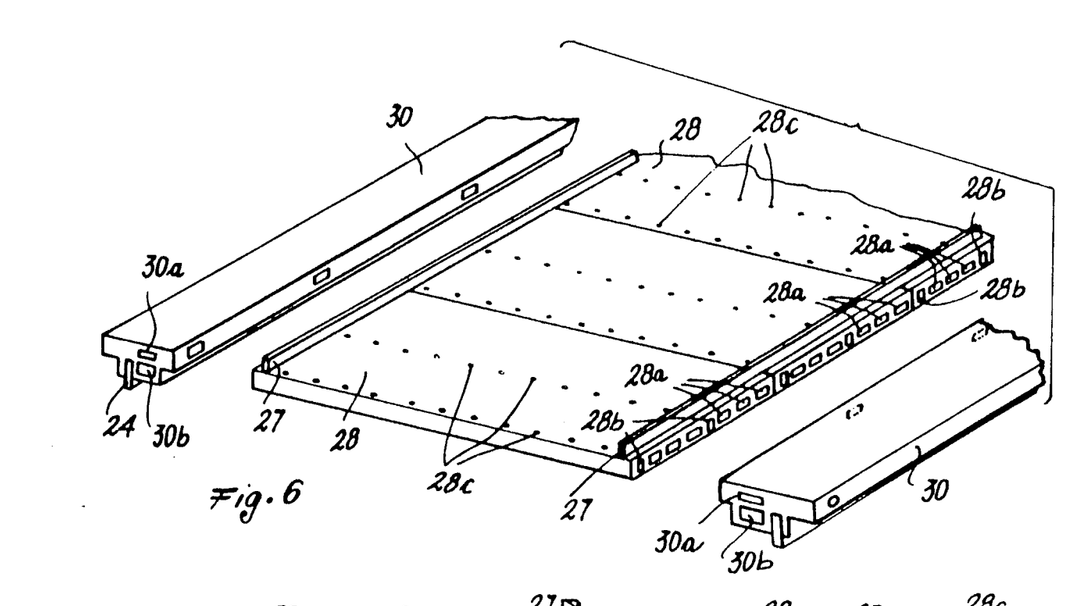
FIG. 6 is a partial exploded view of one of the freezer plates.
Figure 7:
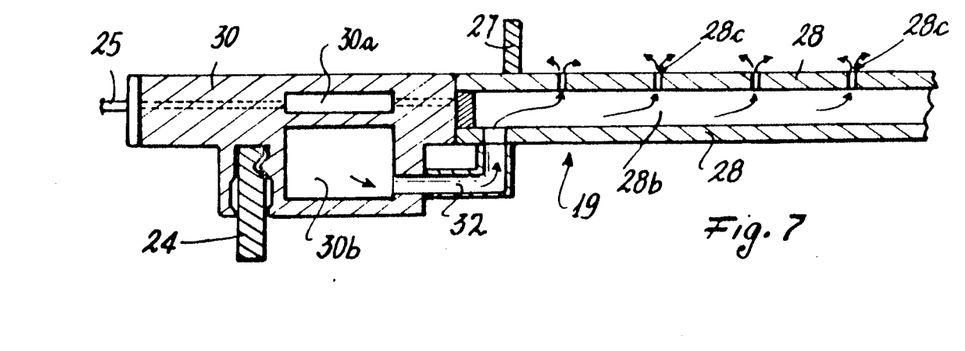
FIG. 7 is a partial sectional view taken through one of the plates on along line VII—VII of FIG. 5.

The plates 19 of the freezer according to the present invention are shown in FIGS. 5, 6 and 7.

FIG. 5 shows two spacers one above the other and separated by spacers 24 of height which matches the height of the product to be frozen. Said spacers can provide different distances between the plates if constructed in accordance with the patent: U.S. Pat. No. 4,841,881. Hoses 25, 26 connect each plate 19 to manifolds (not shown on the drawings) for the circulation of the refrigerant fluid through the plates.

Guides 27 are fixed on the upper surface of each plate to prevent the packages 22 of a product to be frozen from falling off the plate positioned at the mouths 14, 15 during the plate loading and discharge.

FIG. 6 is an exploded view of one of the plates 19. The central region of the plate consists of a series of central elements 28 joined together usually by welding, to form a continuous plate traversed by channels 28a and 28b (FIG. 6), channels 28a being used to circulate the refrigerant fluid and channels 28b being used to feed air to small holes 28c provided along channels 28b through the upper surface of elements 28.

On the lateral ends of the elements 28 there are provided headers 30 which are fixed to the central elements 28 by welding and are each traversed by two longitudinal channels 30a and 30b. The headers 30 positioned to the left in FIGS. 5 and 6 feed compressed air (via the channels 30b) to the channels 28b and from these to the holes 28c, and collect the refrigerant fluid leaving the channels 28a of the central plate elements 28, this fluid leaving through the hoses 26 to be conveyed to a discharge manifold (not shown).

The headers 30 positioned to the right in FIGS. 5 and 6 have their channels 30a connected via a hose 25 to a manifold (not shown) for feeding refrigerant fluid to the channels 28a of each plate element 28, their channel 30b feeding refrigerated and dehumidified compressed air to the channels 28b of said elements 28.

As the channels 28b are closed at their ends and are connected to the channels 30b of the two lateral manifolds 30 only via external tubes 31 (FIG. 7), the refrigerant fluid circuit and the compressed air circuit can operate independently.

FIG. 7 represents an enlarged partial sectional view through a plate portion 19, this section being taken of channel 28b to show the air path from the channel 30b, through the external tubes 32 and into the channel 28b, to then emerge from the holes 28c.

The ends of the headers 30 are closed at the channels 30a so that the refrigerant fluid flows through the elements 28 of each plate but is connected to them only via the hoses 25 and 26 of FIG. 5.

Figure 8:
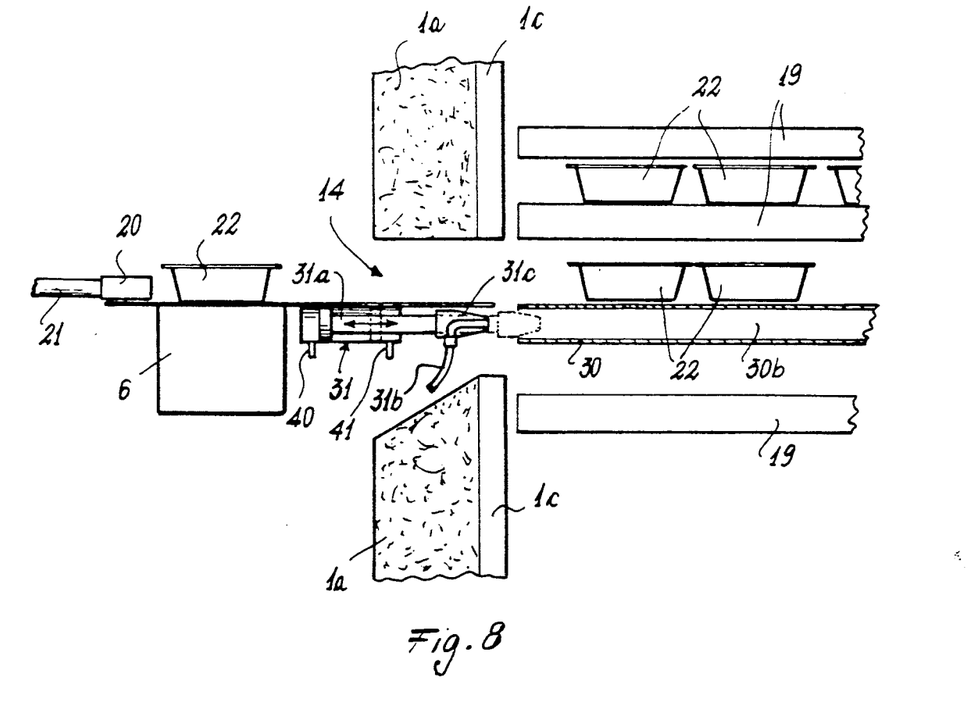
FIG. 8 is a schematic view on an enlarged scale of a portion of the freezer at its loading mouth, at which the device for feeding compressed air to the plate at rest at this mouth is provided.

The air channels 30b are open at both ends to receive air when the plate to which they are connected is at the discharge level in front of the mouth 14, as shown in FIG. 8.

The unit 12 for drying, filtering and possibly removing oil from the compressed air is of a known type and provides an adequate quantity of air which after cooling in the unit 8, in which the air passes through a separate circuit, is fed to four devices 31 (FIG. 8) provided one at each open end of the channels 30b of the two headers 30 of the plate at rest in the loading station.

The devices 31 are therefore located at the mouths 14 and 15 where the plate 19 to be loaded with or unloaded of packages 22 stops. For simplicity, the devices 31 are not shown in FIGS. 3 and 4, and it should be noted that in FIG. 8 the plate 19 at rest in front of device 31 is represented in simplified section, i.e., showing only that part relative to the channel 30b of one of the headers 30.

FIG. 8 is therefore a schematic representation showing the inlet mouth 14 for the product 22 to be frozen and the location of the device 31.

Each of the four devices 31 consists of a normal cylinder containing a piston driven by compressed air fed through the connector 40 or 41 respectively, the piston rod 31a having its free end facing the relative header 30 and carrying a hollow connector 31c, the hollow portion being fed via a hose 31b with the air delivered by the unit 12.

The connector 31c is shaped to mate with the front and rear apertures of the channels 30b of each header 30 forming part of the plate 19 at rest in front of the mouth 14.

Consequently, only the plate 19 to be loaded is connected, when correctly positioned, by operating the air cylinder 31 which moves the rod 31a to cause it to emerge (towards the right in FIG. 8) and engage the connector 31c, usually of rubber material to facilitate sealing, against the adjacent open end of the channel 30b of the header 30.

When engagement has taken place, valves (not shown for simplicity) provided in the circuit containing the air fed by the unit 12 to the hose 31b, allow the compressed air to pass so that it enters the channels 30b of the headers 30, to then pass into the plate channels 28b and emerge from the holes 28c to lift the food product packages 22, which thus become suspended on a cushion of air formed between the base of the packages and the upper surface of the plates, so that the pusher 20 can push the row of packages adjacent to it into the freezer, these packages themselves easily pushing the previous row of packages forwards as there is practically no resistance to movement, with the result being that even extremely light and thus deformable packages can be used without such packages suffering any damage.

The independent unit for cooling and dehumidifying the air circulating within the housing 1 and directly associated with the latter need not be provided if the required air can be cooled by the general refrigeration plant of the factory in which the freezer is installed and operating.

Obviously, numerous modifications and variations of the present invention are possible in light of the above teachings. It is therefore to be understood that within the scope of the appended claims, the invention may be practiced otherwise than as specifically described herein.

I claim:

1. An automated plate freezer for freezing products, which comprises:
    a freezer having a plurality of automatic freezer plates which include a plurality of channels in which holes are provided opening into the upper surface of each plate;
    means for feeding cold dehumidified compressed air into said channels of one of said plates which is positioned at a station for loading products to be frozen into the freezer;
    means for cooling and dehumidifying air present within said freezer and for maintaining said freezer both at a low temperature and with a dehumidified atmosphere; and
    means for generating and maintaining a cold dehumidified air stream between said plates within said freezer.

* * * * *